United States Patent [19]

Klein

[11] Patent Number: 4,655,553
[45] Date of Patent: Apr. 7, 1987

[54] HIGH CONTRAST BACK LIT LIQUID CRYSTAL DISPLAY SYSTEM

[75] Inventor: Herman C. Klein, Los Angeles, Calif.

[73] Assignee: McDonnell Douglas Corporation, Long Beach, Calif.

[21] Appl. No.: 686,024

[22] Filed: Dec. 24, 1984

[51] Int. Cl.[4] .................................................. G02F 1/13
[52] U.S. Cl. ................................. 350/345; 350/339 F
[58] Field of Search ............................. 350/339 F, 345

[56] References Cited

U.S. PATENT DOCUMENTS 4,416,515 11/1983 Funada et al. ............... 350/339 F X

FOREIGN PATENT DOCUMENTS 57-186737 11/1982 Japan .............................. 350/339 F Primary Examiner—John K. Corbin
Assistant Examiner—Richard F. Gallivan
Attorney, Agent, or Firm—Gregory A. Cone; George W. Finch; Donald L. Royer

[57] ABSTRACT

Use of a special blue or blue-green optical filter in a single or double layer dichroic liquid crystal display which is back lit by dimmable incandescent lights provides for easily read, high contrast presentation of information.

5 Claims, 2 Drawing Figures

HIGH CONTRAST BACK LIT LIQUID CRYSTAL DISPLAY SYSTEM

BACKGROUND OF THE INVENTION

This invention relates to dichroic liquid crystal displays. More particularly, this invention relates to liquid crystal displays which are back lit with incandescent lights.

Liquid crystal displays provide a lightweight, low cost, low power display technology which is adaptable for a variety of usages. The most common application is that which is worn on the wrists of millions of people, the LCD wrist watch display. Actually, there are a wide variety of different types of liquid crystal displays, each with its own specific liquid crystal type with its respective optical properties. Most of the liquid crystal displays, however, share a common operating principle. Designated areas of the liquid crystal are sandwiched between two electrodes which produce an electric field therebetween, which in turn causes a change in the optical property of the liquid crystal when compared to its ground state. Dichroic displays operate on an absorption instead of a polarization priciple required by liquid crystal displays using twisted nematic materials. The dichroic liquid crystal display is essentially a light valve. It is opaque in the "OFF" state, appearing black when exposed to incident light. With an applied voltage, the liquid crystal display takes on a transmitting state. The energized bars will present the color of the reflective material. The operation of the dichoic display involves a phase change from the cholesterol state, in which the dye absorps light to the non-absorbing nematic state. The usual application is to form the so-called seven-bar display which is capable of forming all of the numbers or alphanumeric displays capable of forming letters and numbers by selective driving of the individual bar segments. Most all liquid crystal displays are quite easily read in daylight or other high ambient light conditions. Since the liquid crystal display is an optically passive device which requires an outside light source in order to be read, independent lighting means must be provided for low light conditions.

One such low light application is for the displays which are found in the cockpit of an aircraft. During daylight, the high ambient light condition within the cockpit provides sufficient light for the liquid crystal displays to be read easily. However, during night flying conditions, there is little or no ambient light within the cockpit in order the preserve the pilots' night vision. Therefore, the liquid crystal displays would normally be back lit by small incandescent bulbs which are dimmable in much the same manner as are the dashboard instruments lights in an automobile. Unfortunately, these small incandescent lights tend to produce an optical output spectrum in which the longer wavelengths of the visible spectrum (the reds) predominate. This predominantly red light when passed through a liquid crystal element with a white reflector produces a muddy brown appearance of the display instead of the white bar and black background display found under high ambient light conditions and severely degrades the contrast of the liquid crystal display between the energized bars and background. In other words, the prior art incandescent back lit optical display of the liquid crystal appears as light brown bars against a redish brown background with unacceptable results.

It is therefore an object of this invention to provide for a liquid crystal display which may be back lit with incandescent bulbs in a low ambient environment to provide a high contrast display and remarkable improvement in display color.

SUMMARY OF THE INVENTION

The high contrast back lit liquid crystal display system of this invention comprises a transparent front cover plate, which may or may not be required, an information-bearing liquid crystal display behind the cover plate, a dimmable incandescent lighting means disposed behind the liquid crystal display, and an internal optical filter element which strongly attenuates the longer wavelengths present in the visible spectrum emitted by the incandescent lighting means which is disposed between the cover plate and the incandescent lighting means of the display system. The optical filter element is preferrably a blue or blue-green red absorbing optical filter which is located between the liquid crystal display element and the incandescent lighting means.

DETAILED DESCRIPTION OF THE INVENTION

Before turning to a detailed explanation of one specific embodiment of the display system of this invention, it should be realized that there are a variety of LCD's (liquid crystal displays) as well as incandescent lighting elements, each of which may have different spectral characteristics which may call for a slightly different optical band pass of the optical filter element contemplated by this invention. Therefore, although the specific embodiment will be described for a particular type of LCD and a particular incandescent light, the resulting filter characteristic of the optical filter element should not be considered to be limitative with respect to other embodiments which employ other types of LCD's and different incandescent lights.

Figure 1:
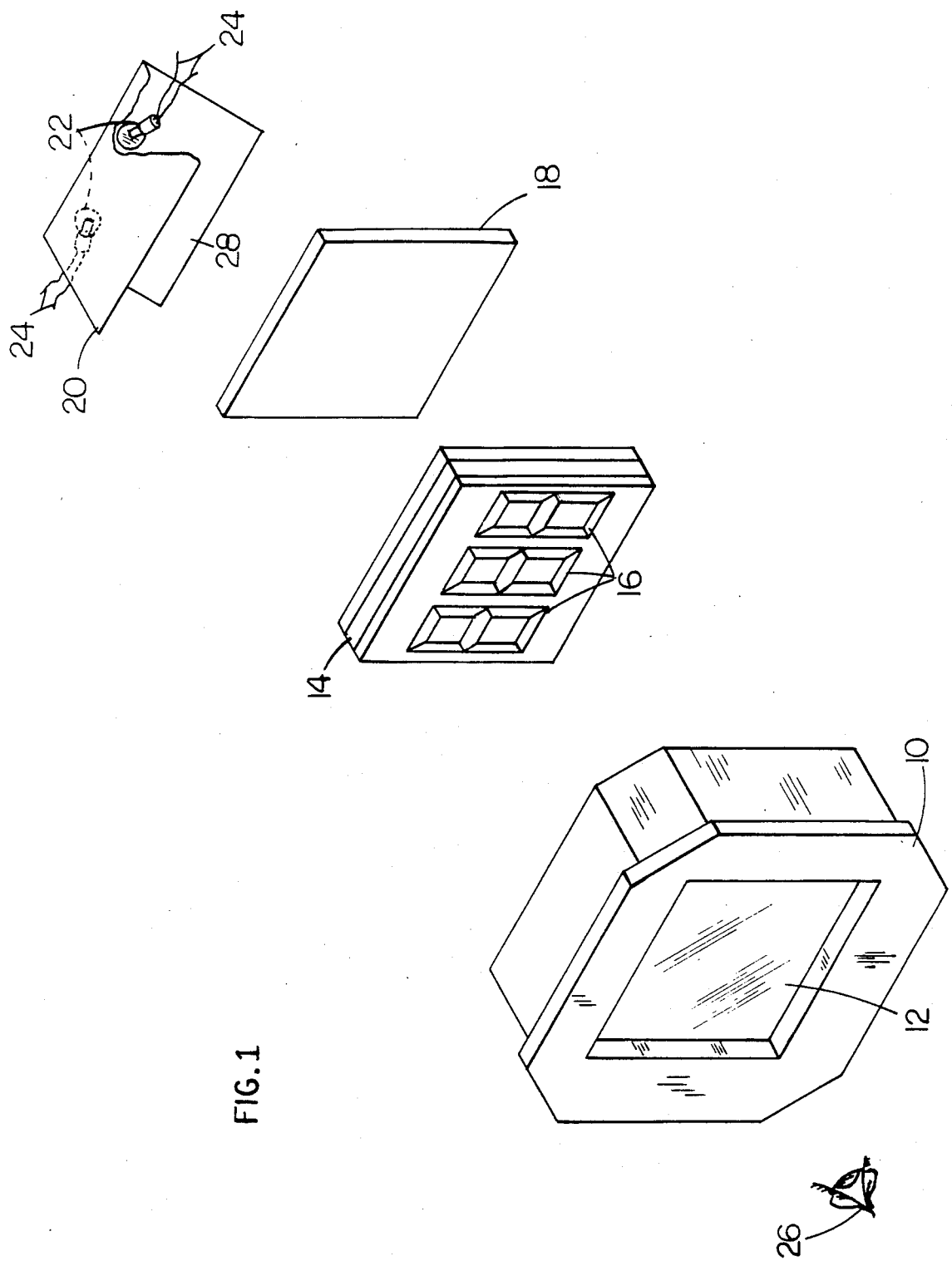
FIG. 1 is an isometric, exploded view of the elements of the display system.

FIG. 1 shows in an exploded isometric view the construction of one specific embodiment of the system of this invention. The front element 10 is a cover plate which has a transparent covered opening 12 through which a viewer 26 may observe the information displayed on the liquid crystal display 14 which would be presented herein on one of the three seven-bar displays 16. The cover plate 10 will normally have an anti-reflectivity coating. Not shown are the various electrical inputs to the liquid crystal display element 14 which drive the various seven-bar displays 16. The double-layer liquid crystal display utilized in the specific embodiment is manufactured by Electronic Display Systems with a series number DND-200. Behind the liquid crystal display 14 is found the integral optical filter element 18. This filter in the specific embodiment is similar to BG-38 made by Schott Optical Glass. Behind the optical filter element 18 and somewhat off axis thereto is the incandescent light optical assembly 20 containing two incandescent light bulbs 22, each of which are accessed and driven by the twin electrical leads 24 which are connected to a power source not shown which provides a varying voltage by which the intensity of the incandescent lights 22 may be controlled by the viewer 26. In the specific embodiment, these bulbs are MS 24367-715 lamps made by General Electric. Also shown as part of the incandescent light optical assembly is a reflector means 28, normally formed of a thin, folded sheet of a thin reflective metal to direct the light produced by the incandescent bulbs 22 into the back side of the filter element 18 and therethrough to the LCD and out to the viewer 26.

Figure 2:
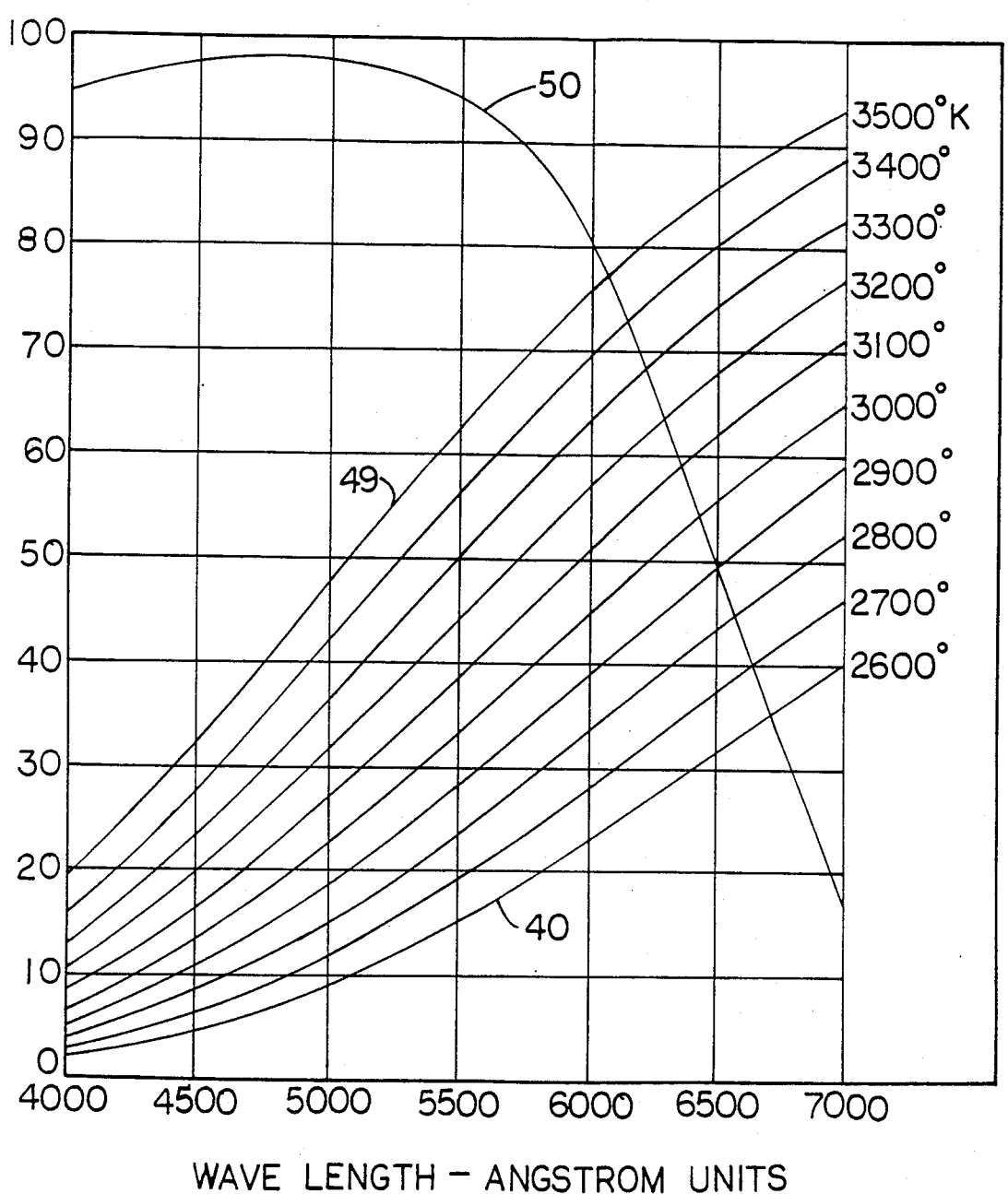
FIG. 2 is a graph showing the spectral characteristics of the incandescent lighting means and the optical attenuation characteristic of the filter element.

FIG. 2 is a graph which shows the approximate spectral characteristic of the incandescent lights and the optical attenuation characteristic of the filter element 18 used in this specific embodiment. As can be seen, the spectral output of the incandescent lights is predominantly in the red end of the visible spectrum. The optical filter element is highly absorptive of the red light such that the resulting system output is much closer to the desired white light output to provide the high contrast and color response necessary for the display system.

The family of curves bounded by curve 40 and curve 49 running from the lower left to the upper right of the graph in FIG. 2 show the spectral energy distribution in the visible region from typical tungsten filaments of equal wattage but different temperatures. Typically, photometric measurements will be taken for contrast and color values in the temperature range between about 2600 to 2900 degrees. The units on the right vertical axis express the relative energy distribution in arbitrary units. The curve labelled 50 gives the transmittance values as a function of wavelength for the particular optical filter element. The units on the left vertical axis for the interpretation of curve 50 are per cent transmittance values. The common independent variable on the horizontal axis for both the transmittance curve 50 and the energy distribution curves 40-49 is wavelength in Angstrom units. The spectral energy distribution curves clearly show the predominance of the long wavelength light for these tungsten filament light bulbs. These long wavelengths are the red portion of the optical spectrum which normally produce the unacceptable muddy brown contrast characteristic when utilized as back light elements behind a liquid crystal display. However, the inclusion of the optical filter element as characterized by its transmittance characteristic 50 attenuates these long wavelengths. As can be seen from the curve 50, the blue through yellow-green portion of the spectrum from about 4,000 to about 6,000 Angstroms is attenuated very little by this filter. However, the orange-red-purple portion of the spectrum from about 6,000 to above 7,000 is attenuated quite strongly by this filter. Therefore, the combination of the blue-green, red absorbing type filter with the tungsten filament light bulbs to back light the liquid crystal display produces an output spectral distribution from the liquid crystal display which results in a high contrast white light being transmitted to the viewer of the system. Of course, the liquid crystal display itself adds in its own filter characteristic; however, this effect is rather benign and does not shift the spectral output of the light bulb-blue-green red absorbing filter subsystem to any great extent.

I claim:

1. A high contrast, back lit liquid crystal display system comprising:
   an information-bearing liquid crystal display assembly;
   a dimmable incandescent lighting means disposed behind the liquid crystal display relative to a viewer of the system; and
   an optical filter element which strongly attenuates radiation in the red portion of the visible light band, disposed in the system between the liquid crystal display assembly and the incandescent lighting means wherein the transmittance of the optical filter element passes greater than 90% of optical radiation shorter than about 5,500 Angstroms and smoothly decreases the transmittance for longer wavelengths to less than about 30% at about 7,000 Angstroms.

2. The display system of claim 1 wherein the liquid crystal display assembly includes a front cover plate having a transparent viewing portion exposing the information-bearing area of the liquid crystal display assembly.

3. The system of claim 1 wherein the incandescent lighting means comprise at least one tungsten filament type bulb.

4. The system of claim 1 further including a reflector means disposed behind the lighting means.

5. A high contrast, back lit liquid crystal display comprising:
   a front cover plate having a transparent viewing portion;
   an information-bearing liquid crystal display behind the cover plate relative to a viewer of the system;
   a dimmable, incandescent tungsten filament lighting means disposed behind liquid crystal display;
   a reflector means disposed behind the lighting means; and
   an optical filter element disposed between the lighting means and the liquid crystal display wherein the transmittance of the optical filter element passes greater than 90% of optical radiation of wavelength shorter than about 5,500 Angstroms and smoothly decreases the transmittance for longer wavelengths to less than about 30% at about 7,000 Angstroms.

* * * * *